US009984461B2

(12) United States Patent
Tang

(10) Patent No.: US 9,984,461 B2
(45) Date of Patent: May 29, 2018

(54) METHOD, APPARATUS, AND TERMINAL FOR OBTAINING VITAL SIGN DATA OF TARGET OBJECT

(71) Applicant: HUAWEI TECHNOLOGIES CO., LTD., Guangdong (CN)

(72) Inventor: Weidong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/391,068

(22) Filed: Dec. 27, 2016

(65) Prior Publication Data

US 2017/0109885 A1    Apr. 20, 2017

Related U.S. Application Data

(63) Continuation of application No. PCT/CN2015/082539, filed on Jun. 26, 2015.

(30) Foreign Application Priority Data

Jun. 27, 2014  (CN) .......................... 2014 1 0301461

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4671* (2013.01); *G06T 7/13* (2017.01); *G06T 2207/10028* (2013.01)

(58) Field of Classification Search
CPC ................................... G06K 9/00; G06T 7/00
(Continued)

(56) References Cited

U.S. PATENT DOCUMENTS 9,098,740 B2 * 8/2015 Yoo .................... G06K 9/00375
2005/0011466 A1   1/2005 Doyle
(Continued)

FOREIGN PATENT DOCUMENTS

CN   101288105 A   10/2008
CN   101657825 A   2/2010
(Continued)

OTHER PUBLICATIONS

Kyung-Hoon Kim et al: "Range and contour fused environment recognition for mobile robot"; International Conference on Multisensor Fusion and Integration for Intelligent Systems, 2001, Aug. 20, 2001 (Aug. 20, 2001), pp. 183-188, XP55382710, DOI: 10.1109/MFI.2001.1013529, ISBN: 978-3-00-008260-3.
(Continued)

*Primary Examiner* — Abolfazl Tabatabai
(74) *Attorney, Agent, or Firm* — Kilpatrick Townsend & Stockton LLP

(57) ABSTRACT

Embodiments of the present invention provide a method for obtaining vital sign data of a target object, including: obtaining a 3D depth image of a target object; obtaining, according to depth values of pixels in the 3D depth image of the target object, framework parameters of the target object and a graphic contour of the target object, where the depth value, is obtained according to the distance information, indicates a distance between a point on the target object and the imaging device; retrieving a 3D model matching the framework parameters of the target object and the graphic contour of the target object from a 3D model library, and obtaining a parameter ratio of the 3D model; obtaining at least one real size of the target object; and obtaining vital sign data of the target object according to the parameter ratio of the 3D model and the at least one real size.

20 Claims, 4 Drawing Sheets

(51) Int. Cl.
  *G06K 9/46*    (2006.01)
  *G06T 7/13*    (2017.01)
  *G06T 15/00*   (2011.01)

(58) Field of Classification Search
  USPC ....... 382/128, 129, 130, 131, 132, 133, 134, 382/154; 348/169; 345/419
  See application file for complete search history.

(56) References Cited

U.S. PATENT DOCUMENTS

| | | |
|---|---|---|
| 2005/0237423 A1 | 10/2005 | Nilson et al. |
| 2006/0250518 A1 | 11/2006 | Nilson et al. |
| 2010/0034457 A1 | 2/2010 | Berliner et al. |
| 2011/0069866 A1 | 3/2011 | Kim et al. |
| 2011/0246329 A1 | 10/2011 | Geisner et al. |
| 2012/0050264 A1 | 3/2012 | Karaoguz et al. |
| 2012/0050481 A1 | 3/2012 | Chen et al. |
| 2013/0028517 A1 | 1/2013 | Yoo et al. |
| 2013/0155195 A1 | 6/2013 | Zalevsky et al. |

FOREIGN PATENT DOCUMENTS

| | | |
|---|---|---|
| CN | 102404585 A | 4/2012 |
| CN | 103294996 A | 9/2013 |
| CN | 103718175 A | 4/2014 |
| CN | 103745218 A | 4/2014 |
| EP | 0358628 A2 | 3/1990 |
| JP | 2004534954 A | 11/2004 |
| JP | 2008541092 A | 11/2008 |
| JP | 2009536731 A | 10/2009 |
| JP | 2012079177 A | 4/2012 |
| JP | 2014522035 A | 8/2014 |
| JP | 2015531098 A | 10/2015 |
| KR | 20030073813 A | 9/2003 |
| WO | 2013189058 A1 | 12/2013 |
| WO | 2014022608 A2 | 2/2014 |

OTHER PUBLICATIONS

Ding-Yun Chen et al: "On Visual Similarity Based 3D Model Retrieval", Computer Graphics Forum, vol. 22, No. 3, Sep. 2003 (Sep. 2003), pp. 223-232, XP055244554, GB, ISSN: 0167-7055, DOI: 10.1111/1467-8659.00669.

European search report dated Jun. 27, 2017 in the corresponding European application (application No. 15810950.4).

Korean Office Action dated Jul. 30, 2016 in the corresponding Korean application (application No. 10-2017-7001223).

The partial supplemental European search report dated Mar. 28, 2017 in the corresponding European Application (Application No. 15810950.4).

\* cited by examiner

METHOD, APPARATUS, AND TERMINAL FOR OBTAINING VITAL SIGN DATA OF TARGET OBJECT

CROSS-REFERENCE TO RELATED APPLICATIONS

This application is a continuation of International Application No. PCT/CN2015/082539, filed on Jun. 26, 2015, which claims priority to Chinese Patent Application No. 201410301461.2, filed on Jun. 27, 2014, The disclosures of the aforementioned applications are hereby incorporated by reference in their entireties.

TECHNICAL FIELD

The present invention relates to the data obtaining field, and in particular, to a method, an apparatus, and a terminal for obtaining vital sign data of a target object.

BACKGROUND

To implement "what you see is what you get" on an intelligent terminal is always a dream of most users. For example, in 2009, Google launches a navigation and geo-location service "Google Maps Navigation" that is based on street views. However, this service needs to be supported by background-powerful geographic image data, a search and calculation capability, and a ubiquitous high-speed network link, and in many areas with narrow network coverage, such a service can hardly be implemented.

SUMMARY

Embodiments of the present invention provide a method, an apparatus, and a terminal for obtaining vital sign data of a target object. A pattern and a framework that are of a target object are restored from a photographed image of the target object, and vital sign data of the target object is presented to a user with reference to various local or cloud search applications, to implement experience of "what you see is what you get" for users.

According to a first aspect, the present invention provides a method for obtaining vital sign data of a target object, including:

obtaining a 3D depth image of a target object, where the 3D depth image is a two-dimensional image with distance information, and the distance information includes a distance between the target object and an imaging device;

obtaining, according to depth values of pixels in the 3D depth image of the target object, framework parameters of the target object and a graphic contour of the target object, where the depth value indicates a distance that is between a point on the target object and the imaging device and that is obtained according to the distance information;

retrieving a 3D model matching the framework parameters of the target object and the graphic contour of the target object from a 3D model library, and obtaining a parameter ratio of the 3D model;

obtaining at least one real size of the target object; and obtaining vital sign data of the target object according to the parameter ratio of the 3D model and the at least one real size.

With reference to the first aspect, in a first possible implementation manner of the first aspect, the obtaining a 3D depth image of a target object includes:

transmitting a reference pattern to the target object;

receiving a secondary pattern obtained from the reference pattern being reflected by the target object;

calculating an offset value of the secondary pattern relative to the reference pattern; and obtaining the distance information by performing Fourier transformation on the offset value, and obtaining the 3D depth image by using the distance information.

With reference to the first aspect or the first possible implementation manner of the first aspect, in a second possible implementation manner of the first aspect, the obtaining a graphic contour of the target object according to depth values of pixels in the 3D depth image of the target object includes:

performing difference calculation on the depth values of the pixels in the 3D depth image, to obtain the graphic contour of the target object; and specifically, the performing difference calculation on the depth values of the pixels in the 3D depth image includes:

calculating a depth value difference between a pixel depth value of a first pixel in the 3D depth image and a pixel depth value of each of four neighboring pixels connected to the first pixel, to obtain four first depth difference values;

when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, separately performing difference calculation between a pixel depth value of the second pixel and a pixel depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

With reference to any implementation manner of the first aspect to the second possible implementation manner of the first aspect, in a third possible implementation manner of the first aspect, after the obtaining a 3D depth image of a target object, the method further includes:

performing background noise reduction processing on the 3D depth image, to obtain a first 3D target depth image; and correspondingly, the performing difference calculation on the depth values of the pixels in the 3D depth image, to obtain the graphic contour of the target object includes:

performing difference calculation on depth values of pixels in the first 3D target depth image, to obtain the graphic contour of the target object.

With reference to the third possible implementation manner of the first aspect, in a fourth possible implementation manner of the first aspect, the performing background noise reduction processing on the 3D depth image, to obtain a first 3D target depth image includes:

setting a depth threshold; and comparing a depth value of each pixel in the 3D depth image with the depth threshold, filtering out a pixel that is in the 3D depth image and whose pixel depth value is greater than the depth threshold, and obtaining remaining pixels to form the first 3D target depth image.

With reference to the fourth possible implementation manner of the first aspect, in a fifth possible implementation manner of the first aspect, after the obtaining the first 3D target depth image, the method further includes:

performing edge noise reduction processing on the first 3D target depth image, to obtain a second 3D target depth image; and correspondingly, the performing difference calculation on the depth values of the pixels in the 3D depth image, to obtain the graphic contour of the target object includes: performing difference calculation on depth values of pixels in the second 3D target depth image, to obtain the graphic contour of the target object.

With reference to the fifth possible implementation manner of the first aspect, in a sixth possible implementation manner of the first aspect, the performing edge noise reduction processing on the first 3D target depth image, to obtain a second 3D target depth image includes:

segmenting the first 3D target depth image into multiple pixel blocks;

setting a pixel depth segment interval;

performing average processing on pixel depth values of all pixels in each of the pixel blocks, to obtain a pixel average value of each of the pixel blocks; and mapping the pixel average value to a corresponding interval in the pixel depth segment interval, and combining pixel blocks corresponding to all pixel average values in a same interval, to obtain the second 3D target depth image.

With reference to any implementation manner of the first aspect to the sixth possible implementation manner of the first aspect, in a seventh possible implementation manner of the first aspect, the obtaining framework parameters of the target object according to depth values of pixels in the 3D depth image of the target object includes:

obtaining a central axis of the target object according to pixel depth values of all pixels in the 3D depth image of the target object and by using a linear least square method;

calculating transverse thicknesses of the graphic contour of the target object along multiple first lines perpendicular to the central axis;

calculating longitudinal thicknesses of the graphic contour of the target object along multiple second lines parallel to the central axis; and constituting a framework of the target object by using areas limited by the first lines and the second lines, where the corresponding transverse thicknesses and longitudinal thicknesses are the framework parameters of the target object.

With reference to the seventh possible implementation manner of the first aspect, in an eighth possible implementation manner of the first aspect, the retrieving a 3D model matching the framework parameters of the target object and the graphic contour of the target object from a 3D model library, and obtaining a parameter ratio of the 3D model includes:

performing matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtaining the front-view graphic contour of the 3D model according to the graphic contour of the 3D model;

calculating a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotating the front-view graphic contour of the 3D model based on the visual angle parameter, to obtain framework parameters of the 3D model;

obtaining, by means of comparison, a similarity between the framework parameters of the target object and the framework parameters of the 3D model, where when the similarity is less than a preset value, the 3D model is the 3D model matching the framework parameters of the target object and the graphic contour of the target object; and obtaining the parameter ratio of the 3D model by using the 3D model.

With reference to the eighth possible implementation manner of the first aspect, in a ninth possible implementation manner of the first aspect, the 3D model library includes graphic contours of all visual angles of the 3D model, and includes at least the front-view graphic contour of the 3D model.

With reference to the ninth possible implementation manner of the first aspect, in a tenth possible implementation manner of the first aspect, the performing matching between the graphic contour of the target object and a graphic contour of a 3D model in the 3D model library, to obtain a graphic contour of a 3D model with a highest matching degree includes:

describing the graphic contour of the target object by using a Zernike moment descriptor and a Fourier descriptor, to obtain first description information;

describing the graphic contour of the 3D model in the 3D model library by using the Zernike moment descriptor and the Fourier descriptor, to obtain second description information; and comparing the first description information and the second description information, and using a graphic contour of a 3D model corresponding to second description information that differs from the first description information by a preset threshold as the graphic contour of the 3D model with the highest matching degree.

With reference to any implementation manner of the first aspect to the tenth possible implementation manner of the first aspect, in an eleventh possible implementation manner of the first aspect, the obtaining at least one real size of the target object includes:

transmitting a sound wave signal to the target object;

receiving a sound wave signal reflected by the target object;

obtaining transmission time of the sound wave signal, where the transmission time is a difference between time of transmitting the sound wave signal and time of receiving the sound wave signal;

calculating a distance between a surface of the target object and the imaging device by using the transmission time and a propagation velocity of the sound wave signal; and calculating the at least one real size of the target object by using the distance and an image distance of the imaging device.

According to a second aspect, the present invention provides an apparatus for obtaining vital sign data of a target object, including: an imaging module, configured to obtain a 3D depth image of a target object, where the 3D depth image is a two-dimensional image with distance information, and the distance information includes a distance between the target object and an imaging device;

a graphic contour and framework parameters obtaining module, configured to obtain, according to depth values of pixels in the 3D depth image of the target object, framework parameters of the target object and a graphic contour of the target object, where the depth value indicates a distance that is between a point on the target object and the imaging device and that is obtained according to the distance information;

a parameter ratio obtaining module, configured to retrieve a 3D model matching the framework parameters of the target object and the graphic contour of the target object from a 3D model library, and obtain a parameter ratio of the 3D model;

a real size obtaining module, configured to obtain at least one real size of the target object; and a vital sign data obtaining module, configured to obtain vital sign data of the target object according to the parameter ratio of the 3D model and the at least one real size.

With reference to the second aspect, in a first possible implementation manner of the second aspect, the imaging module includes:

a transmit unit, configured to transmit a reference pattern to the target object;

a receive unit, configured to receive a secondary pattern obtained from the reference pattern being reflected by the target object;

a calculation unit, configured to calculate an offset value of the secondary pattern relative to the reference pattern; and an image obtaining unit, configured to: obtain the distance information by performing Fourier transformation on the offset value, and obtain the 3D depth image by using the distance information.

With reference to the second aspect or the first possible implementation manner of the second aspect, in a second possible implementation manner of the second aspect, the graphic contour and framework parameters obtaining module is specifically configured to perform difference calculation on the depth values of the pixels in the 3D depth image, to obtain the graphic contour of the target object; and specifically, the performing difference calculation on the depth values of the pixels in the 3D depth image includes:

calculating a depth value difference between a pixel depth value of a first pixel in the 3D depth image and a pixel depth value of each of four neighboring pixels connected to the first pixel, to obtain four first depth difference values;

when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, separately performing difference calculation between a pixel depth value of the second pixel and a pixel depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

With reference to any possible implementation manner of the second aspect to the second possible implementation manner of the second aspect, in a third possible implementation manner of the second aspect, the apparatus further includes a noise reduction module, where the noise reduction module is configured to:

perform background noise reduction processing on the 3D depth image, to obtain a first 3D target depth image; and correspondingly, the performing difference calculation on the depth values of the pixels in the 3D depth image, to obtain the graphic contour of the target object includes:

performing difference calculation on depth values of pixels in the first 3D target depth image, to obtain the graphic contour of the target object.

With reference to the third possible implementation manner of the second aspect, in a fourth possible implementation manner of the second aspect, the noise reduction module is specifically configured to:

set a depth threshold; and compare a depth value of each pixel in the 3D depth image with the depth threshold, filter out a pixel that is in the 3D depth image and whose pixel depth value is greater than the depth threshold, and obtain remaining pixels to form the first 3D target depth image.

With reference to the fourth possible implementation manner of the second aspect, in a fifth possible implementation manner of the second aspect, the noise reduction module is further configured to:

perform edge noise reduction processing on the first 3D target depth image, to obtain a second 3D target depth image; and correspondingly, the performing difference calculation on the depth values of the pixels in the 3D depth image, to obtain the graphic contour of the target object includes:

performing difference calculation on depth values of pixels in the second 3D target depth image, to obtain the graphic contour of the target object.

With reference to the fifth possible implementation manner of the second aspect, in a sixth possible implementation manner of the second aspect, the noise reduction module is specifically configured to:

segment the first 3D target depth image into multiple pixel blocks;

set a pixel depth segment interval;

perform average processing on pixel depth values of all pixels in each of the pixel blocks, to obtain a pixel average value of each of the pixel blocks; and map the pixel average value to a corresponding interval in the pixel depth segment interval, and combine pixel blocks corresponding to all pixel average values in a same interval, to obtain the second 3D target depth image.

With reference to any implementation manner of the second aspect to the sixth possible implementation manner of the second aspect, in a seventh possible implementation manner of the second aspect, the graphic contour and framework parameters obtaining module is specifically configured to:

obtain a central axis of the target object according to pixel depth values of all pixels in the 3D depth image of the target object and by using a linear least square method;

calculate transverse thicknesses of the graphic contour of the target object along multiple first lines perpendicular to the central axis;

calculate longitudinal thicknesses of the graphic contour of the target object along multiple second lines parallel to the central axis; and constitute a framework of the target object by using areas limited by the first lines and the second lines, where the corresponding transverse thicknesses and longitudinal thicknesses are the framework parameters of the target object.

With reference to the seventh possible implementation manner of the second aspect, in an eighth possible implementation manner of the second aspect, the parameter ratio obtaining module is specifically configured to:

perform matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtain the front-view graphic contour of the 3D model according to the graphic contour of the 3D model;

calculate a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotate the front-view graphic contour of the 3D model based on the visual angle parameter, to obtain framework parameters of the 3D model;

obtain, by means of comparison, a similarity between the framework parameters of the target object and the framework parameters of the 3D model, where when the similarity is less than a preset value, the 3D model is the 3D model matching the framework parameters of the target object and the graphic contour of the target object; and obtain the parameter ratio of the 3D model by using the 3D model.

With reference to the eighth possible implementation manner of the second aspect, in a ninth possible implementation manner of the second aspect, the 3D model library includes graphic contours of all visual angles of the 3D model, and includes at least the front-view graphic contour of the 3D model.

With reference to the ninth possible implementation manner of the second aspect, in a tenth possible implementation manner of the second aspect, the parameter ratio obtaining module is specifically configured to:

describe the graphic contour of the target object by using a Zernike moment descriptor and a Fourier descriptor, to obtain first description information;

describe the graphic contour of the 3D model in the 3D model library by using the Zernike moment descriptor and the Fourier descriptor, to obtain second description information; and compare the first description information and the second description information, and use a graphic contour of a 3D model corresponding to second description information that differs from the first description information by a preset threshold as the graphic contour of the 3D model with the highest matching degree.

With reference to any implementation manner of the second aspect to the tenth possible implementation manner of the second aspect, in an eleventh possible implementation manner of the second aspect, the real size obtaining module is specifically configured to:

transmit a sound wave signal to the target object;

receive a sound wave signal reflected by the target object;

obtain transmission time of the sound wave signal, where the transmission time is a difference between time of transmitting the sound wave signal and time of receiving the sound wave signal;

calculate a distance between a surface of the target object and the imaging device by using the transmission time and a propagation velocity of the sound wave signal; and calculate the at least one real size of the target object by using the distance and an image distance of the imaging device.

According to a third aspect, the present invention provides a terminal for obtaining vital sign data of a target object, including:

a 3D sensor, configured to obtain a 3D depth image of a target object, where the 3D depth image is a two-dimensional image with distance information, and the distance information includes a distance between the target object and an imaging device; and a processor, configured to obtain, according to depth values of pixels in the 3D depth image of the target object, framework parameters of the target object and a graphic contour of the target object, where the depth value indicates a distance that is between a point on the target object and the imaging device and that is obtained according to the distance information, the processor is further configured to retrieve a 3D model matching the framework parameters of the target object and the graphic contour of the target object from a 3D model library, and obtain a parameter ratio of the 3D model, and the processor is further configured to obtain at least one real size of the target object and obtain vital sign data of the target object according to the parameter ratio of the 3D model and the at least one real size.

With reference to the third aspect, in a first possible implementation manner of the third aspect, the 3D sensor is specifically configured to:

transmit a reference pattern to the target object, receive a secondary pattern obtained from the reference pattern being reflected by the target object, calculate an offset value of the secondary pattern relative to the reference pattern, obtain the distance information by performing Fourier transformation on the offset value, and obtain the 3D depth image by using the distance information.

With reference to the third aspect or the first possible implementation manner of the third aspect, in a second possible implementation manner of the third aspect, the processor is specifically configured to perform difference calculation on the depth values of the pixels in the 3D depth image, to obtain the graphic contour of the target object; and specifically, the performing difference calculation on the depth values of the pixels in the 3D depth image includes:

calculating a depth value difference between a pixel depth value of a first pixel in the 3D depth image and a pixel depth value of each of four neighboring pixels connected to the first pixel, to obtain four first depth difference values;

when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, separately performing difference calculation between a pixel depth value of the second pixel and a pixel depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

With reference to any implementation manner of the third aspect to the second possible implementation manner of the third aspect, in a third possible implementation manner of the third aspect, the processor is further configured to perform background noise reduction processing on the 3D depth image, to obtain a first 3D target depth image; and correspondingly, the performing difference calculation on the depth values of the pixels in the 3D depth image, to obtain the graphic contour of the target object includes: performing difference calculation on depth values of pixels in the first 3D target depth image, to obtain the graphic contour of the target object.

With reference to the third possible implementation manner of the third aspect, in a fourth possible implementation manner of the third aspect, the processor is specifically configured to:

set a depth threshold; and compare a depth value of each pixel in the 3D depth image with the depth threshold, filter out a pixel that is in the 3D depth image and whose pixel depth value is greater than the depth threshold, and obtain remaining pixels to form the first 3D target depth image.

With reference to the fourth possible implementation manner of the third aspect, in a fifth possible implementation manner of the third aspect, the processor is further configured to:

perform edge noise reduction processing on the first 3D target depth image, to obtain a second 3D target depth image; and correspondingly, the performing difference calculation on the depth values of the pixels in the 3D depth image, to obtain the graphic contour of the target object includes: performing difference calculation on depth values of pixels in the second 3D target depth image, to obtain the graphic contour of the target object.

With reference to the fifth possible implementation manner of the third aspect, in a sixth possible implementation manner of the third aspect, the processor is specifically configured to:

segment the first 3D target depth image into multiple pixel blocks;

set a pixel depth segment interval;

perform average processing on pixel depth values of all pixels in each of the pixel blocks, to obtain a pixel average value of each of the pixel blocks; and map the pixel average value to a corresponding interval in the pixel depth segment interval, and combine pixel blocks corresponding to all pixel average values in a same interval, to obtain the second 3D target depth image.

With reference to any implementation manner of the third aspect to the sixth possible implementation manner of the third aspect, in a seventh possible implementation manner of the third aspect, the processor is specifically configured to:

obtain a central axis of the target object according to pixel depth values of all pixels in the 3D depth image of the target object and by using a linear least square method;

calculate transverse thicknesses of the graphic contour of the target object along multiple first lines perpendicular to the central axis;

calculate longitudinal thicknesses of the graphic contour of the target object along multiple second lines parallel to the central axis; and constitute a framework of the target object by using areas limited by the first lines and the second lines, where the corresponding transverse thicknesses and longitudinal thicknesses are the framework parameters of the target object.

With reference to the seventh possible implementation manner of the third aspect, in an eighth possible implementation manner of the third aspect, the processor is specifically configured to:

perform matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtain the front-view graphic contour of the 3D model according to the graphic contour of the 3D model;

calculate a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotate the front-view graphic contour of the 3D model based on the visual angle parameter, to obtain framework parameters of the 3D model;

obtain, by means of comparison, a similarity between the framework parameters of the target object and the framework parameters of the 3D model, where when the similarity is less than a preset value, the 3D model is the 3D model matching the framework parameters of the target object and the graphic contour of the target object; and obtain the parameter ratio of the 3D model by using the 3D model.

With reference to the eighth possible implementation manner of the third aspect, in a ninth possible implementation manner of the third aspect, the 3D model library includes graphic contours of all visual angles of the 3D model, and includes at least the front-view graphic contour of the 3D model.

With reference to the ninth possible implementation manner of the third aspect, in a tenth possible implementation manner of the third aspect, the processor is specifically configured to describe the graphic contour of the target object by using a Zernike moment descriptor and a Fourier descriptor, to obtain first description information;

describe the graphic contour of the 3D model in the 3D model library by using the Zernike moment descriptor and the Fourier descriptor, to obtain second description information; and compare the first description information and the second description information, and use a graphic contour of a 3D model corresponding to second description information that differs from the first description information by a preset threshold as the graphic contour of the 3D model with the highest matching degree.

With reference to any implementation manner of the third aspect to the tenth possible implementation manner of the third aspect, in an eleventh possible implementation manner of the third aspect, the processor is specifically configured to:

transmit a sound wave signal to the target object;

receive a sound wave signal reflected by the target object;

obtain transmission time of the sound wave signal, where the transmission time is a difference between time of transmitting the sound wave signal and time of receiving the sound wave signal;

calculate a distance between a surface of the target object and the imaging device by using the transmission time and a propagation velocity of the sound wave signal; and calculate the at least one real size of the target object by using the distance and an image distance of the imaging device.

In the embodiments of the present invention, a 3D depth image of a target object is obtained, framework parameters of the target object and a graphic contour of the target object are obtained according to depth values of pixels in the 3D depth image of the target object, a 3D model matching the framework parameters of the target object and the graphic contour of the target object is retrieved from a 3D model library, a parameter ratio of the 3D model is obtained, and at least one real size of the target object is obtained, so that vital sign data of the target object is obtained according to the parameter ratio of the 3D model and the at least one real size. In the present invention, with reference to real-time obtaining of a terminal and a local 3D model library or a 3D model library in the cloud, the vital sign data of the target object is presented to people in a real-time manner, and a dream of "what you see is what you get" of people is implemented.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a method for obtaining vital sign data of a target object. A pattern and a framework that are of a target object are restored from a photographed image of the target object, and vital sign data of the target object is presented to a user with reference to various local or cloud search applications, to implement a dream of "what you see is what you get" of people.

Embodiment 1

Figure 1:
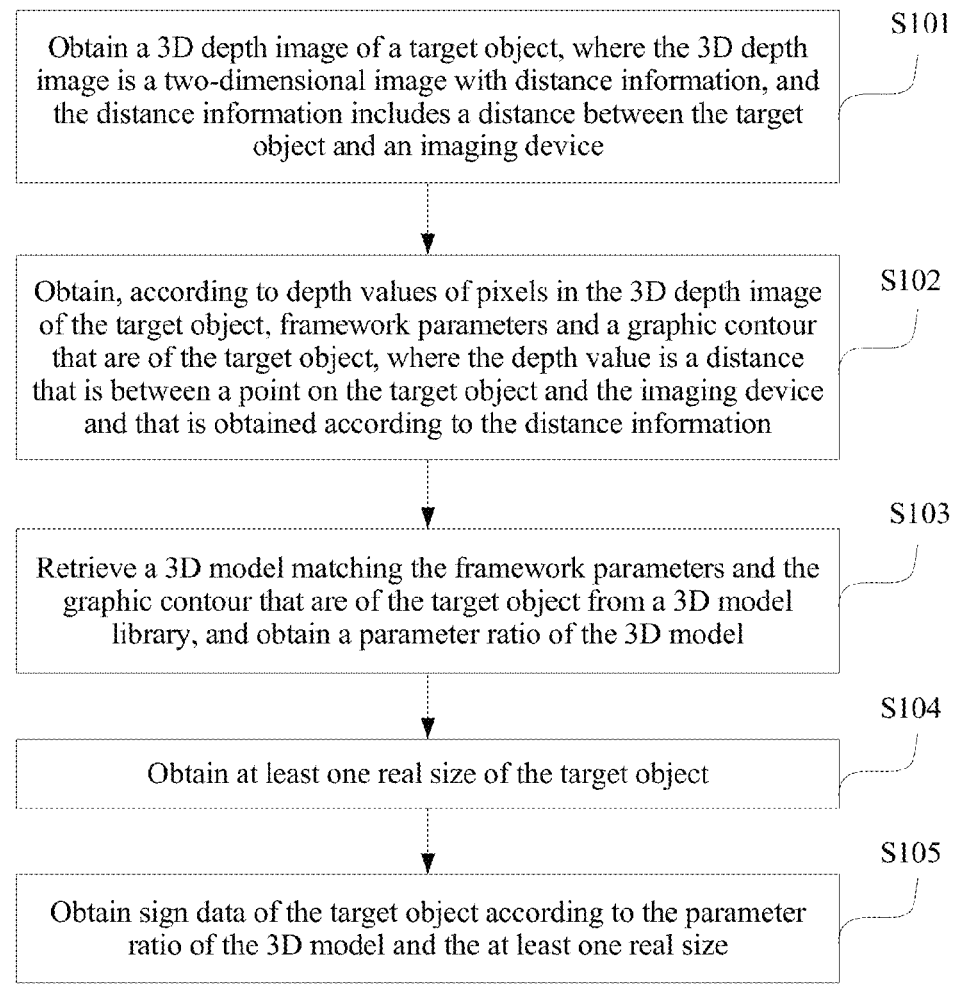
FIG. 1 is a schematic flowchart of a method for obtaining vital sign data of a target object according to an embodiment of the present invention.

Referring to FIG. 1, FIG. 1 shows a method 100 for obtaining vital sign data of a target object according to an embodiment of the present invention, and the method includes:

S101. Obtain a 3D depth image of a target object, where the 3D depth image is a two-dimensional image with distance information, and the distance information includes a distance between the target object and an imaging device.

In specific implementation, the target object may be photographed by using a camera of a terminal, to obtain the 3D depth image. Optionally, this obtaining process may be implemented in the following manner:

First, the terminal transmits a reference pattern to the foregoing target object. There may be multiple choices for the reference pattern herein, for example, a square raster pattern, a cellular raster pattern, or the reference pattern may be a pattern including distributed speckles, which is not limited herein. In addition, for protection of the target object, a light generation source of the reference pattern is an infrared beam generator that can perform beam power control, and therefore, when the target object is a human body or an animal body, the light generation source of the reference pattern causes no harm to the human body or the animal body.

As described above, the terminal transmits the reference pattern to the target object, and a feature size parameter of the reference pattern is preset. For example, when the reference pattern is a raster pattern, both a shape and a spacing of a raster may be preset.

Then, a secondary pattern obtained from the reference pattern being reflected by the target object is received. The receiving here may be that the terminal shoots the target object by using a build-in or outer-connected camera, to obtain the secondary pattern obtained after the foregoing reference pattern is reflected by the target object. A two-dimensional image of the target object is obtained together. Because obtaining, by a camera, a two-dimensional planar image of an object is a mature technology, a method for implementing the technology is not described or limited herein.

Further, an offset value of the secondary pattern relative to the reference pattern is calculated. Because the feature size parameter of the reference pattern is preset, the offset value of the secondary pattern relative to the reference pattern is calculated after the secondary pattern is obtained. The offset value may also be referred to as a deformation value. That is, a deformation amount, of the secondary pattern, generated relative to the reference pattern is reflected by using the value.

Finally, the distance information is obtained by performing Fourier transformation on the offset value, and the 3D depth image is obtained by using the distance information.

Based on the foregoing obtained offset value, the offset value is processed by using Fourier transformation, to obtain the distance information. The distance information here is used to describe a distance between the imaging camera and the shot target object, and may be specifically embodied as a distance between each pixel in the two-dimensional image of the target object and the imaging camera. Based on this distance information and with reference to the foregoing shot and obtained two-dimensional image of the target object, the 3D depth image with the distance information may be obtained.

S102. Obtain, according to depth values of pixels in the 3D depth image of the target object, framework parameters of the target object and a graphic contour of the target object. The depth value indicates a distance that is between a point on the target object and the imaging device and that is obtained according to the distance information.

The 3D depth image of the target object includes all pixels forming the image. The distance information obtained according to S101 may be used to describe distance information. i.e., the pixel depth values indicating distances between these pixels and the imaging camera. Further, the framework parameters of the target object and the graphic contour of the target object are obtained according to the pixel depth values. In a specific implementation process, obtaining the graphic contour of the target object according to the pixel depth values may be implemented according to the following method.

Difference calculation is performed on the depth values of the pixels in the 3D depth image, to obtain the graphic contour of the target object. Specifically, the difference calculation herein may include the following steps:

First, a depth value difference between a pixel depth value of a first pixel in the 3D depth image and a pixel depth value of each of four neighboring pixels connected to the first pixel is calculated, to obtain four first depth difference values, where the first pixel herein may be a pixel randomly selected from the 3D depth image. Location relationships between the four neighboring pixels connected to the first pixel and the first pixel may be separately left, right, above, and below.

Then, when at least one first depth difference value in the four first depth difference values is greater than a first difference threshold, a neighboring pixel corresponding to the at least one first depth difference value is marked as a contour location, where the first difference threshold here may be preset according to experience.

Then, it is queried whether a pixel marked as a contour location exists in eight neighboring pixels connected to a second pixel in the 3D depth image; if the pixel marked as a contour location exists in the eight neighboring pixels connected to the second pixel in the 3D depth image, difference calculation is separately performed between a pixel depth value of the second pixel and a pixel depth value of a pixel that is in the eight neighboring pixels connected to the second pixel and that is a non-contour location, to obtain a second depth difference value. When at least one of the second depth difference value is greater than a second difference threshold, the second pixel is marked as a contour location, where the second pixel herein may also be any pixel in the 3D depth image, where the second difference threshold herein may be preset according to experience. When the pixel marked as a contour location exists in the eight neighboring pixels connected to the second pixel, difference calculation is separately performed between the pixel depth value of the second pixel and a pixel depth value of a pixel except the pixel shown to be marked as a contour location. Once a difference calculation result obtained by means of calculation is greater than the second difference threshold, the second pixel is marked as a contour location.

Figure 2:
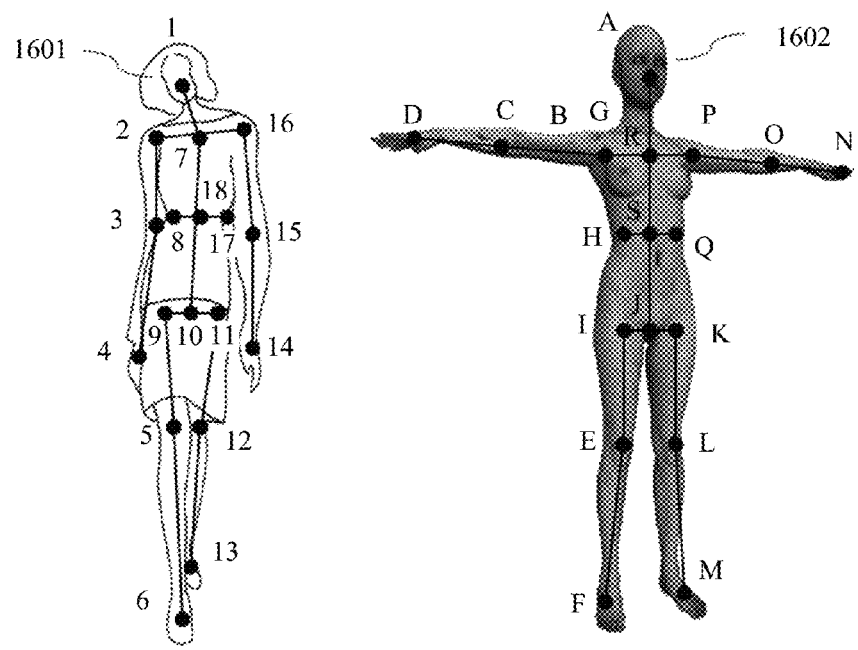
FIG. 2 is a reference diagram of specific steps of a method for obtaining vital sign data of a target object according to an embodiment of the present invention.

Finally, the graphic contour of the target object is obtained according to pixels marked as contour locations. Based on the foregoing steps, the pixels in the foregoing 3D depth image are grouped into pixels that are marked as contour locations and pixels that are not marked as contour locations, and all pixels that are marked as contour locations form the graphic contour of the target object. In addition, the framework parameters of the target object are obtained according to the depth values of the pixels in the 3D depth image of the target object. First, a principle of the framework parameter should be understood. A human body framework parameter is used as an example, and a framework structure in human anatomy meets a specific natural ratio feature. Regardless of a westerner or an easterner, a male or a female, and a minor or a major, skeleton lengths thereof are different, but basic skeleton structures are the same. FIG. 2 shows an 18-node human body framework model, which is used as an example. If in any two human body framework models, ratios of distances between neighboring and interconnected nodes in all same human body parts including a forearm, an upper arm, a torso, a head, a waist, buttocks, a thigh, and a crus to references (central axis) of the human body frameworks are the same, the two human body frameworks are totally the same. As shown in FIG. 2, it is assumed that a ratio of a distance between any neighboring and interconnected nodes in each part of a reconstructed human body framework model 1601 to a reference (central axis) of the framework and a ratio of a same framework of a same part of a standard human body framework model 1602 to a reference (central axis) of the framework are the same or highly similar, it may be considered that the framework 1601 and the framework 1602 are a same 3D model, that is:

$$\Delta = \frac{Z}{\text{Base}} - \frac{Zi}{\text{Base } i},$$

where

Z here refers to a framework length of the target object, Base refers to a framework reference length of the target object, Zi refers to a framework length of a model whose number is i in a 3D model library, Basei refers to a framework reference length of the model whose number is i in the 3D model library, and $\Delta$ is a permissible difference, where a value of the permissible difference may be obtained according to an experience value, or selected according to a specific situation.

In a specific implementation process, obtaining the framework parameters of the target object according to depth values of pixels in the 3D depth image of the target object may be specifically implemented by using the following steps:

First, a central axis of the target object is obtained according to pixel depth values of the all pixels in the 3D depth image of the target object and by using a linear least square method. When the foregoing target object is a human body, the central axis is generally a spine of the human body.

Then, transverse thicknesses of the graphic contour of the target object are calculated along multiple first lines perpendicular to the central axis. As described above, when the central axis is the spine of the human body, a transverse framework of the human body is obtained by extending along multiple first lines perpendicular to the spine.

Longitudinal thicknesses of the graphic contour of the target object are calculated along multiple second lines parallel to the central axis. As described above, when the central axis is the spine of the human body, a longitudinal framework of the human body is obtained by extending along multiple second lines parallel to the spine.

A framework of the target object is constituted by using areas limited by the first lines and the second lines, where the corresponding transverse thicknesses and longitudinal thicknesses are the framework parameters of the target object.

S103. Retrieve a 3D model matching the framework parameters of the target object and the graphic contour of the target object from a 3D model library, and obtain a parameter ratio of the 3D model.

Based on the foregoing obtained framework parameters of the target object and graphic contour of the target object, the 3D model matching both the framework parameters of the target object and the graphic contour of the target object is retrieved from the 3D model library. The 3D model library herein may be a standard model library stored in a cloud server, or a standard model library locally stored, and a model with a highest matching degree with the foregoing obtained framework parameters and graphic contour that are of the target object is retrieved from such a standard model library. Pre-stored model library data may be from human body 3D data provided by a third-party data provider, and the data generally includes various typical body shape 3D data of all countries, areas, and races all over the world. Optionally, the pre-stored model library data may be from an auto-learning result of a machine, for example, an owner of an intelligent terminal may obtain auto-learning 3D model data by measuring, calculating, and adjusting a specific target within a period of time. It may be understood that, in addition to human body 3D data, there may be 3D data of an animal body or another visible target object, and details are not described herein.

Figure 3:
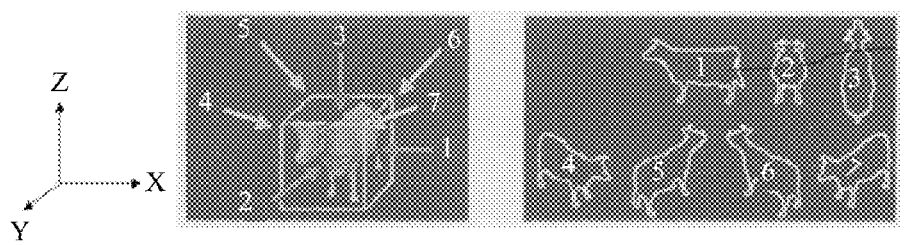
FIG. 3 is another reference diagram of specific steps of a method for obtaining vital sign data of a target object according to an embodiment of the present invention.

In the technical field of the present invention, multiple related algorithms support 3D model retrieving and matching. However, to simplify calculation in a terminal and in the cloud and improve a response speed, in this embodiment of the present invention, a pre-stored 3D model includes at least two types of parameters: a graphic contour and a framework parameter. As shown in FIG. 3, 2D contour parameters of a 3D model of a bull in this example separately indicate graphic contours of the target that are recorded by projecting from directions of the target, including projection contours from 1 side, 2 front, 4 left-front, 5 left-rear, 6 right-front, and 7 right-rear. A projection contour from 3 directly above is generally not mandatory. Alternatively, to increase matching accuracy, the graphic contours may include projection graphic contours (not shown in the figure) of the target that are recorded from all angles of left-directly front, left-directly rear, right-directly front, right-directly rear, and the like. During matching calculation, a Chen's algorithm, that is, a 2D Zernike moment descriptor and a Fourier descriptor (FD, Fourier Descriptor), is used to obtain, by means of comparison, a similarity between one or more target object graphic contours of a same target object and a graphic contour in each direction of the 3D model library, a graphic contour having a highest similarity is retrieved, and a visual angle value of a projection of a 3D standard model corresponding to the graphic contour is returned. As shown in FIG. 3, a similarity between a graphic contour of a target object and a graphic contour of a 3D model of a bull in a 3D model library is the highest, and a returned observation result is that the graphic contour of the target object is a projection of the 3D model of the bull along a negative direction of an X-coordinate.

Specifically, retrieving the 3D model matching the framework parameters of the target object and the graphic contour of the target object from a 3D model library, and obtaining a parameter ratio of the 3D model specifically includes:

performing matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtaining the front-view graphic contour of the 3D model according to the graphic contour of the 3D model;

calculating a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotating the front-view graphic contour of the 3D model based on the visual angle parameter, to obtain framework parameters of the 3D model;

obtaining, by means of comparison, a similarity between the framework parameters of the target object and the framework parameters of the 3D model, where when the similarity is less than a preset value, the 3D model is the 3D model matching the framework parameters of the target object and the graphic contour of the target object; and obtaining the parameter ratio of the 3D model by using the 3D model.

As described above, the 3D model library includes graphic contours of all visual angles of the 3D model, and includes at least the front-view graphic contour of the 3D model.

Further, the performing matching between the graphic contour of the target object and a graphic contour of a 3D model in the 3D model library, to obtain a graphic contour of a 3D model with a highest matching degree includes:

describing the graphic contour of the target object by using a Zernike moment descriptor and a Fourier descriptor, to obtain first description information;

describing the graphic contour of the 3D model in the 3D model library by using the Zernike moment descriptor and the Fourier descriptor, to obtain second description information; and comparing the first description information and the second description information, and using a graphic contour of a 3D model corresponding to second description information that differs from the first description information by a preset threshold as the graphic contour of the 3D model with the highest matching degree.

As shown in FIG. 3, framework data in a standard 3D model library needs to be rotated and projected to a negative direction of an X-axis, to implement accurate framework similarity retrieving and matching.

An ideal effect can be achieved by using this retrieving method even when an environment changes. Generally, different clothes worn by and postures of a human body target affect a human body graphic contour obtained by means of calculation by using a 3D depth image. For example, because light clothes are worn in summer and heavy clothes are worn in winter, there is a large difference between human body graphic contours obtained by means of calculation. If similarity retrieving is performed only according to a human body graphic contour, an obtained 3D model has a large deviation, and therefore, a framework parameter is introduced herein. In a case in which both the framework parameters of the target object and the graphic contour of the target object are determined, accuracy of an obtained 3D model is high.

S104. Obtain at least one real size of the target object.

The 3D model that is of the target object and that is obtained by means of retrieving in S103 is a standard unit model, and the parameter ratio of the 3D model further needs to be multiplied by at least one real geometric parameter (for example, an actual height or arm length of a user) of the target object, and a 3D model completely matching the target object can be obtained only after same-ratio amplifying is performed. In a specific operation, the at least one real size of the target object may be obtained by using the following steps:

transmitting a sound wave signal to the target object;

receiving a sound wave signal reflected by the target object;

obtaining transmission time of the sound wave signal, where the transmission time is a difference between time of transmitting the sound wave signal and time of receiving the sound wave signal;

calculating a distance between a surface of the target object and the imaging device by using the transmission time and a propagation velocity of the sound wave signal; and calculating the at least one real size of the target object by using the distance and an image distance of the imaging device.

Specifically, in most using situations, a user and a photographer do not know a real geometric parameter of the target object, and therefore, at least one real geometric parameter, also referred to as a real size herein, of the target object needs to be obtained in a real-time measurement manner. An optional manner is: measuring and calculating a height of the target by using a method of recording an image of the target object by using a camera. When a mobile terminal enables a photographing and 3D depth measurement application, a speaker component of a mobile terminal periodically transmits a sound wave signal to the target, and this transmitting action may be synchronous with a detecting action of a 3D sensor. The sound wave signal may be beyond a frequency range (20 Hz to 20 KHz) of human body auditory sensation, to avoid causing interference to the user and the human body target. When the sound wave signal is returned after meeting the target object, the sound wave signal is received by a microphone component. A distance $D1=1/2\times V\times \Delta t$ between the target and the photographer may be obtained by calculating a propagation time $\Delta t$ of the sound wave signal, where V is a propagation velocity of this frequency sound wave in ambient air. In addition, the image of the target object is recorded in a camera component. A height h of an image of the target object may be obtained by means of calculation by using an image contour identification technology. For a determined mobile terminal, an image distance D2 of a camera component is the only determined hardware parameter. In this way, a real height H of the target object may be obtained by means of calculation according to the following formula:

$$H = \frac{D1}{D2} \times h.$$

Based on a same principle, this solution may also be used to measure another geometric parameter such as a length or a width of the target, and details are not described herein.

Figure 4:
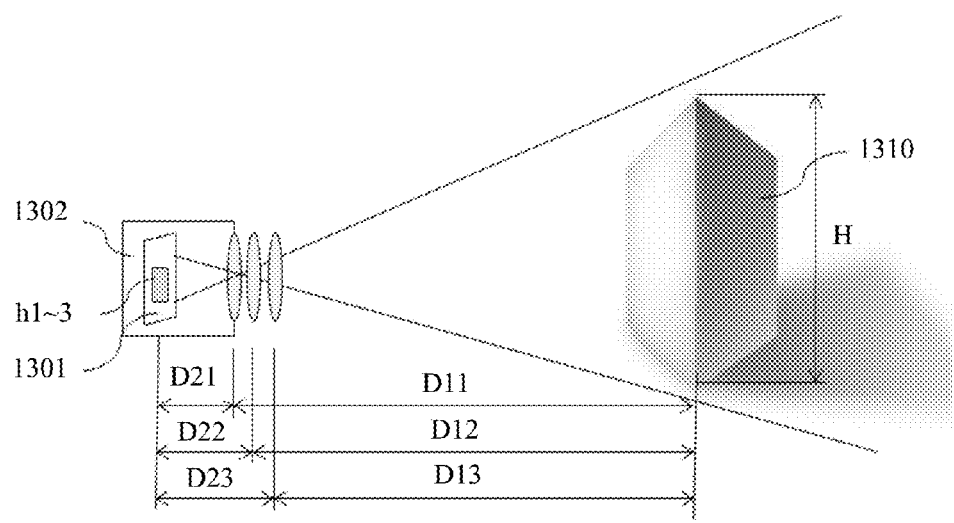
FIG. 4 is still another reference diagram of specific steps of a method for obtaining vital sign data of a target object according to an embodiment of the present invention.

The at least one real size of the target object may be measured by using another method in addition to the foregoing measurement method, for example:

When the user operates the mobile terminal to perform shooting and 3D measurement on the target object, the mobile terminal records at least two photos of the target object at the same time, and these photos are captured by using camera components with different focal distance parameters. In an embodiment shown in FIG. 4, a terminal camera obtains three photos with different image distances by using three different focal distances. Two photos thereof are used as an example; image distances separately corresponding to the two photos are D21 and D22, imaging heights are h1 and h2, and a lens distance change of two shooting parameters is A. Because a real height of a target object is uniquely determined, the photos obviously meet the following geometric formulas:

$$\frac{h1}{H} = \frac{D21}{D11}$$
$$\frac{h2}{H} = \frac{D22}{D12}$$
$$D11 = D12 + \Delta$$
$$D22 = D21 + \Delta$$

In a case in which a hardware parameter of a camera module is determined, both D21 and D22 are known parameters, and h1 and h2 may be obtained by means of calculation by using a pixel method. A height H of the target object may be obtained by means of calculation according to the following formula:

$$H = \frac{D21 \times h2 - D22 \times h1}{h1 \times h2 \times \Delta}.$$

S105. Obtain vital sign data of the target object according to the parameter ratio of the 3D model and the at least one real size.

In a specific operation, the parameter ratio of the 3D model, obtained by means of retrieving, with the highest matching degree may be multiplied by the real height H of the target, so that a real framework model of the target may be obtained.

In another feasible solution of this embodiment, the vital sign data of the human body target object may be further obtained by means of calculation by using a real geometric parameter that is of the target and that is directly entered from a touchscreen of an I/O interface of the mobile phone, where the real geometric parameter may be one piece of data such as a height, an arm length, or a shoulder width. Alternatively, the user may obtain relatively accurate vital sign data of the target object by means of calculation by dynamically adjusting an entered real geometric parameter of the target. Further, optionally, in this embodiment, various sign parameters such as a weight, chest, waist, and hip sizes, an arm length, and a shoulder width of a human body target 420 may be obtained by means of calculation according to a specific parameter (such as a density) in a sign feature parameter library, and are displayed on a user input/output interface. Alternatively, with reference to various business databases and customary setting of the user, the various sign parameters may be used for clothes size and matching suggestion, advertisement push, and the like.

It should be noted that this embodiment may be not only applied to vital sign data measurement in a process of shooting a target object, but may also be applied to a 3D measurement and vital sign data obtaining process in video shooting of a mobile target object.

In this embodiment of the present invention, a 3D depth image of a target object is obtained, and framework parameters of the target object and a graphic contour of the target object are restored according to the 3D depth image, and therefore, a 3D model corresponding to the target object is retrieved based on the graphic contour and the framework parameters, and further, vital sign data of the target object is obtained by using the 3D model, so that users can obtain a sign parameter of a seen object anywhere at any time by performing virtual reconstruction by using a terminal, and user experience of "what you see is what you get" is implemented.

It should be noted that, in most photographing applications, if a main target is a human body, a result obtained by means of calculation is accurate. However, if two or more persons appear and overlap with or shield each other in a real scenario, different human body objects need to be separately processed during processing. A simple method is processing overlapped human body targets in a background noise manner and by using an image depth filtering algorithm, and another feasible method is separating overlapped images and performing calculation. It should be noted that, in the technical solution involved in this embodiment, a single target object or an independent target object obtained after separation is mainly involved.

In a new embodiment, for enabling the obtained graphic contour of the target object to be more accurate, in this embodiment, background noise reduction is performed on the 3D depth image based on background noise reduction processing, to obtain a first 3D target depth image, to obtain an independent graphic contour of the target object, which specifically includes: performing difference calculation on depth values of pixels in the first 3D target depth image, to obtain the graphic contour of the target object.

Specifically, the performing background noise reduction processing on the 3D depth image, to obtain the first 3D target depth image includes:

setting a depth threshold; and comparing a depth value of each pixel in the 3D depth image with the depth threshold, filtering out a pixel that is in the 3D depth image and whose pixel depth value is greater than the depth threshold, and obtaining remaining pixels to form the first 3D target depth image.

Further, in a new embodiment, the foregoing obtained first 3D target depth image may be further processed, that is:

performing edge noise reduction processing on the first 3D target depth image, to obtain a second 3D target depth image; and correspondingly, the performing difference calculation on the depth values of the pixels in the 3D depth image, to obtain the graphic contour of the target object includes: performing difference calculation on depth values of pixels in the second 3D target depth image, to obtain the graphic contour of the target object.

Therefore, an independent graphic contour with a clear edge may be obtained.

Specifically, the performing edge noise reduction processing on the first 3D target depth image, to obtain a second 3D target depth image includes:

segmenting the first 3D target depth image into multiple pixel blocks;

setting a pixel depth segment interval;

performing average processing on pixel depth values of all pixels in each of the pixel blocks, to obtain a pixel average value of each of the pixel blocks; and mapping the pixel average value to a corresponding interval in the pixel depth segment interval, and combining pixel blocks corresponding to all pixel average values in a same interval, to obtain the second 3D target depth image.

Embodiment 2

Figure 5:
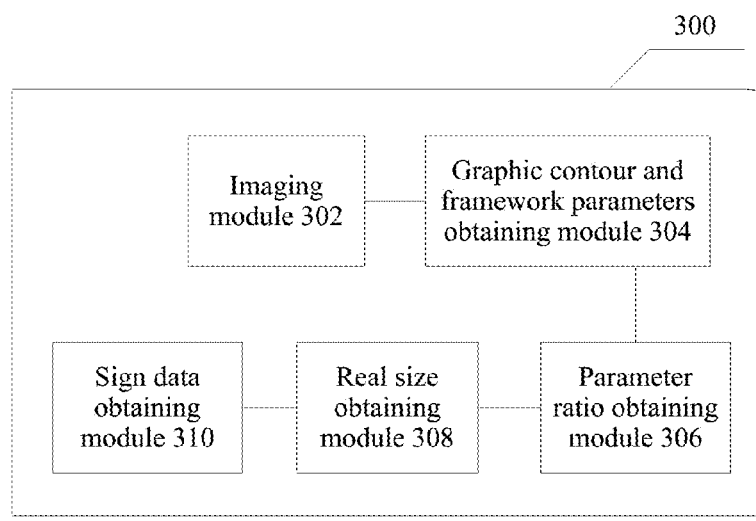
FIG. 5 is a first schematic diagram of an apparatus for obtaining vital sign data of a target object according to an embodiment of the present invention.

Referring to FIG. 5, FIG. 5 shows an apparatus 300 for obtaining vital sign data of a target object according to an embodiment of the present invention, and the apparatus includes:

an imaging module 302, configured to obtain a 3D depth image of a target object, where the 3D depth image is a two-dimensional image with distance information, and the distance information includes a distance between the target object and an imaging device;

a graphic contour and framework parameters obtaining module 304, configured to obtain, according to depth values of pixels in the 3D depth image of the target object, framework parameters of the target object and a graphic contour of the target object, where the depth value indicates a distance that is between a point on the target object and the imaging device and that is obtained according to the distance information;

a parameter ratio obtaining module 306, configured to retrieve a 3D model matching the framework parameters of the target object and the graphic contour of the target object from a 3D model library, and obtain a parameter ratio of the 3D model;

a real size obtaining module 308, configured to obtain at least one real size of the target object; and a vital sign data obtaining module 310, configured to obtain vital sign data of the target object according to the parameter ratio of the 3D model and the at least one real size.

In this embodiment of the present invention, an imaging device obtains a 3D depth image of a target object; a graphic contour and framework parameters obtaining module restores, according to the 3D depth image, framework parameters of the target object and a graphic contour of the target object; a parameter ratio obtaining module retrieves, based on the graphic contour and the framework parameters, a 3D model corresponding to the target object; a vital sign data obtaining module obtains vital sign data of the target object according to the 3D model. Therefore, users can obtain a sign parameter of a seen object anywhere at any time by performing virtual reconstruction by using a terminal, and user experience of "what you see is what you get" is implemented.

On the basis of Embodiment 2, further, in another embodiment, the imaging module 302 may specifically include:

a transmit unit, configured to transmit a reference pattern to the target object;

a receive unit, configured to receive a secondary pattern obtained from the reference pattern being reflected by the target object;

a calculation unit, configured to calculate an offset value of the secondary pattern relative to the reference pattern; and an image obtaining unit, configured to: obtain the distance information by performing Fourier transformation on the offset value, and obtain the 3D depth image by using the distance information.

On the basis of the foregoing embodiment, further, in another embodiment, the graphic contour and framework parameters obtaining module is specifically configured to perform difference calculation on the depth values of the pixels in the 3D depth image, to obtain the graphic contour of the target object; and specifically, the performing difference calculation on the depth values of the pixels in the 3D depth image includes:

calculating a depth value difference between a pixel depth value of a first pixel in the 3D depth image and a pixel depth value of each of four neighboring pixels connected to the first pixel, to obtain four first depth difference values;

when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, separately performing difference calculation between a pixel depth value of the second pixel and a pixel depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

Figure 6:
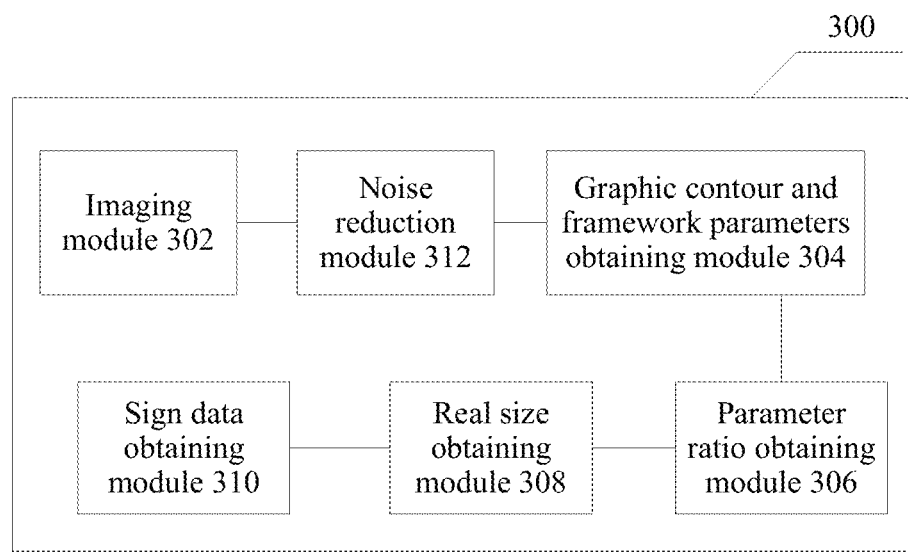
FIG. 6 is a second schematic diagram of an apparatus for obtaining vital sign data of a target object according to an embodiment of the present invention.

On the basis of the foregoing embodiment, further, referring to FIG. 6, in another embodiment, the foregoing apparatus 300 further includes a noise reduction module 312, where the noise reduction module 312 is configured to:

perform background noise reduction processing on the 3D depth image, to obtain a first 3D target depth image; and correspondingly, the performing difference calculation on the depth values of the pixels in the 3D depth image, to obtain the graphic contour of the target object includes: performing difference calculation on depth values of pixels in the first 3D target depth image, to obtain the graphic contour of the target object.

Further, the noise reduction module 312 is specifically configured to:

set a depth threshold; and compare a depth value of each pixel in the 3D depth image with the depth threshold, filter out a pixel that is in the 3D depth image and whose pixel depth value is greater than the depth threshold, and obtain remaining pixels to form the first 3D target depth image.

Further, the noise reduction module 312 may be further configured to:

perform edge noise reduction processing on the first 3D target depth image, to obtain a second 3D target depth image; and correspondingly, the performing difference calculation on the depth values of the pixels in the 3D depth image, to obtain the graphic contour of the target object includes: performing difference calculation on depth values of pixels in the second 3D target depth image, to obtain the graphic contour of the target object.

Further, optionally, the noise reduction module 312 is specifically configured to:

segment the first 3D target depth image into multiple pixel blocks;

set a pixel depth segment interval;

perform average processing on pixel depth values of all pixels in each of the pixel blocks, to obtain a pixel average value of each of the pixel blocks; and map the pixel average value to a corresponding interval in the pixel depth segment interval, and combine pixel blocks corresponding to all pixel average values in a same interval, to obtain the second 3D target depth image.

On the basis of the foregoing embodiment, further, in another embodiment, the graphic contour and framework parameters obtaining module 304 is specifically configured to:

obtain a central axis of the target object according to pixel depth values of all pixels in the 3D depth image of the target object and by using a linear least square method;

calculate transverse thicknesses of the graphic contour of the target object along multiple first lines perpendicular to the central axis;

calculate longitudinal thicknesses of the graphic contour of the target object along multiple second lines parallel to the central axis; and constitute a framework of the target object by using areas limited by the first lines and the second lines, where the corresponding transverse thicknesses and longitudinal thicknesses are the framework parameters of the target object.

On the basis of the foregoing embodiment, further, in another embodiment, the parameter ratio obtaining module 306 is specifically configured to:

perform matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtain the front-view graphic contour of the 3D model according to the graphic contour of the 3D model;

calculate a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotate the front-view graphic contour of the 3D model based on the visual angle parameter, to obtain framework parameters of the 3D model;

obtain, by means of comparison, a similarity between the framework parameters of the target object and the framework parameters of the 3D model, where when the similarity is less than a preset value, the 3D model is the 3D model matching the framework parameters of the target object and the graphic contour of the target object; and obtain the parameter ratio of the 3D model by using the 3D model.

The 3D model library includes graphic contours of all visual angles of the 3D model, and includes at least the front-view graphic contour of the 3D model.

On the basis of the foregoing embodiment, further, in another embodiment, the parameter ratio obtaining module 306 is specifically configured to:

describe the graphic contour of the target object by using a Zernike moment descriptor and a Fourier descriptor, to obtain first description information;

describe the graphic contour of the 3D model in the 3D model library by using the Zernike moment descriptor and the Fourier descriptor, to obtain second description information; and compare the first description information and the second description information, and use a graphic contour of a 3D model corresponding to second description information that differs from the first description information by a preset threshold as the graphic contour of the 3D model with the highest matching degree.

On the basis of the foregoing embodiment, further, in another embodiment, the real size obtaining module 308 is specifically configured to:

transmit a sound wave signal to the target object;
receive a sound wave signal reflected by the target object;
obtain transmission time of the sound wave signal, where the transmission time is a difference between time of transmitting the sound wave signal and time of receiving the sound wave signal;
calculate a distance between a surface of the target object and the imaging device by using the transmission time and a propagation velocity of the sound wave signal; and
calculate the at least one real size of the target object by using the distance and an image distance of the imaging device.

Embodiment 3

Figure 7:
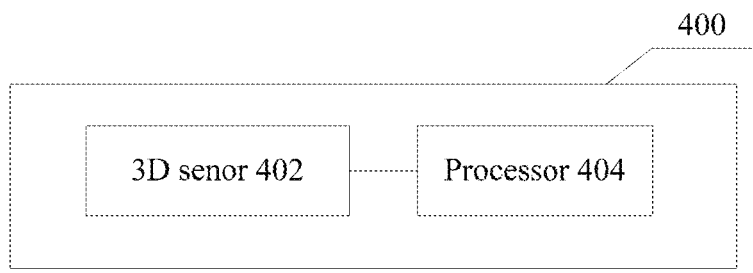
FIG. 7 is a schematic diagram of a terminal for obtaining vital sign data of a target object according to an embodiment of the present invention.

Referring to FIG. 7, FIG. 7 shows a terminal 400 for obtaining vital sign data of a target object according to an embodiment of the present invention, and the terminal includes:

a 3D sensor 402, configured to obtain a 3D depth image of a target object, where the 3D depth image is a two-dimensional image with distance information, and the distance information includes a distance between the target object and an imaging device; and a processor 404, configured to obtain, according to depth values of pixels in the 3D depth image of the target object, framework parameters of the target object and a graphic contour of the target object, where the depth value indicates a distance that is between a point on the target object and the imaging device and that is obtained according to the distance information, the processor is further configured to retrieve a 3D model matching the framework parameters of the target object and the graphic contour of the target object from a 3D model library, and obtain a parameter ratio of the 3D model, and the processor is further configured to obtain at least one real size of the target object and obtain vital sign data of the target object according to the parameter ratio of the 3D model and the at least one real size.

On the basis of Embodiment 3, optionally, the 3D sensor 402 may be specifically configured to:

transmit a reference pattern to the target object, receive a secondary pattern obtained from the reference pattern being reflected by the target object, calculate an offset value of the secondary pattern relative to the reference pattern, obtain the distance information by performing Fourier transformation on the offset value, and obtain the 3D depth image by using the distance information.

On the basis of the foregoing embodiment, further, optionally, the processor 404 is specifically configured to perform difference calculation on the depth values of the pixels in the 3D depth image, to obtain the graphic contour of the target object; and specifically, the performing difference calculation on the depth values of the pixels in the 3D depth image includes:

calculating a depth value difference between a pixel depth value of a first pixel in the 3D depth image and a pixel depth value of each of four neighboring pixels connected to the first pixel, to obtain four first depth difference values;

when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, separately performing difference calculation between a pixel depth value of the second pixel and a pixel depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

On the basis of the foregoing embodiment, further, optionally, the processor 404 may be further specifically configured to perform background noise reduction processing on the 3D depth image, to obtain a first 3D target depth image; and correspondingly, the performing difference calculation on the depth values of the pixels in the 3D depth image, to obtain the graphic contour of the target object includes: performing difference calculation on depth values of pixels in the first 3D target depth image, to obtain the graphic contour of the target object.

Further, the processor 404 may be specifically configured to:

set a depth threshold; and compare a depth value of each pixel in the 3D depth image with the depth threshold, filter out a pixel that is in the 3D depth image and whose pixel depth value is greater than the depth threshold, and obtain remaining pixels to form the first 3D target depth image.

On the basis of the foregoing embodiment, further, optionally, the processor 404 may be further specifically configured to:

perform edge noise reduction processing on the first 3D target depth image, to obtain a second 3D target depth image; and correspondingly, the performing difference calculation on the depth values of the pixels in the 3D depth image, to obtain the graphic contour of the target object includes: performing difference calculation on depth values of pixels in the second 3D target depth image, to obtain the graphic contour of the target object.

Further, the processor 404 may be specifically configured to:

segment the first 3D target depth image into multiple pixel blocks;

set a pixel depth segment interval;

perform average processing on pixel depth values of all pixels in each of the pixel blocks, to obtain a pixel average value of each of the pixel blocks; and map the pixel average value to a corresponding interval in the pixel depth segment interval, and combine pixel blocks corresponding to all pixel average values in a same interval, to obtain the second 3D target depth image.

Further, the processor 404 may be specifically configured to:

obtain a central axis of the target object according to pixel depth values of all pixels in the 3D depth image of the target object and by using a linear least square method;

calculate transverse thicknesses of the graphic contour of the target object along multiple first lines perpendicular to the central axis;

calculate longitudinal thicknesses of the graphic contour of the target object along multiple second lines parallel to the central axis; and constitute a framework of the target object by using areas limited by the first lines and the second lines, where the corresponding transverse thicknesses and longitudinal thicknesses are the framework parameters of the target object.

Further, the processor 404 may be specifically configured to:

perform matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtain the front-view graphic contour of the 3D model according to the graphic contour of the 3D model;

calculate a visual angle parameter of the 3D model according to the graphic contour of the 3D model and the front-view graphic contour of the 3D model, where the visual angle parameter is a visual angle that is of the graphic contour of the 3D model based on the front-view graphic contour of the 3D model;

rotate the front-view graphic contour of the 3D model based on the visual angle parameter, to obtain framework parameters of the 3D model;

obtain, by means of comparison, a similarity between the framework parameters of the target object and the framework parameters of the 3D model, where when the similarity is less than a preset value, the 3D model is the 3D model matching the framework parameters of the target object and the graphic contour of the target object; and obtain the parameter ratio of the 3D model by using the 3D model.

The 3D model library includes graphic contours of all visual angles of the 3D model, and includes at least the front-view graphic contour of the 3D model.

Further, the processor 404 may be specifically configured to: describe the graphic contour of the target object by using a Zernike moment descriptor and a Fourier descriptor, to obtain first description information;

describe the graphic contour of the 3D model in the 3D model library by using the Zernike moment descriptor and the Fourier descriptor, to obtain second description information; and compare the first description information and the second description information, and use a graphic contour of a 3D model corresponding to second description information that differs from the first description information by a preset threshold as the graphic contour of the 3D model with the highest matching degree.

Further, the processor 404 may be specifically configured to:

transmit a sound wave signal to the target object;

receive a sound wave signal reflected by the target object;

obtain transmission time of the sound wave signal, where the transmission time is a difference between time of transmitting the sound wave signal and time of receiving the sound wave signal;

calculate a distance between a surface of the target object and the imaging device by using the transmission time and a propagation velocity of the sound wave signal; and calculate the at least one real size of the target object by using the distance and an image distance of the imaging device.

It should be noted that, the foregoing embodiments all derive from a same inventive concept, and the descriptions of the embodiments have their respective focuses. For a part that is not described in detail in an embodiment, refer to related descriptions in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, and an optical disc.

The activity identification method and system provided in the embodiments of the present invention are described in detail above. In this specification, the principle and implementation manners of the present invention are described herein through specific examples. The foregoing description about the embodiments is merely intended to help understand the method and core ideas of the present invention. In addition, a person of ordinary skill in the art can make modifications in terms of the specific implementation manners and the application scope according to the ideas of the present invention. In conclusion, the content of this specification shall not be construed as a limitation to the present invention.

What is claimed is:

1. A method for obtaining vital sign data of a target object, comprising:
    obtaining a 3D depth image of a target object, wherein the 3D depth image is a two-dimensional image with distance information, and the distance information indicates a distance between the target object and an imaging device;
    obtaining, according to depth values of pixels in the 3D depth image of the target object, framework parameters of the target object and a graphic contour of the target object, wherein the depth value indicates a distance, obtained according to the distance information, between a point on the target object and the imaging device;
    retrieving a 3D model matching the framework parameters of the target object and the graphic contour of the target object from a 3D model library, and obtaining a parameter ratio of the 3D model;
    obtaining at least one real size of the target object; and
    obtaining vital sign data of the target object according to the parameter ratio of the 3D model and the at least one real size.

2. The method according to claim 1, wherein obtaining the 3D depth image of a target object comprises:
    transmitting a reference pattern to the target object;
    receiving a secondary pattern obtained from the reference pattern being reflected by the target object;
    calculating an offset value of the secondary pattern relative to the reference pattern; and
    obtaining the distance information by performing Fourier transformation on the offset value, and obtaining the 3D depth image by using the distance information.

3. The method according to claim 1, wherein obtaining the graphic contour of the target object according to depth values of pixels in the 3D depth image of the target object comprises:
    performing difference calculation on the depth values of the pixels in the 3D depth image, to obtain the graphic contour of the target object, wherein performing the difference calculation on the depth values of the pixels in the 3D depth image comprises:
    calculating a depth value difference between a depth value of a first pixel in the 3D depth image and a depth value of each of four neighboring pixels connected to the first pixel, to obtain four first depth difference values;
    when at least one first depth difference value in the four first depth difference values is greater than a first difference threshold, marking a neighboring pixel corresponding to the at least one first depth difference value as a contour location;

querying whether a pixel marked as a contour location exists in eight neighboring pixels connected to a second pixel in the 3D depth image;

if the pixel marked as a contour location exists in the eight neighboring pixels connected to the second pixel in the 3D depth image, performing difference calculation between a depth value of the second pixel and a depth value of a pixel that is in the eight neighboring pixels connected to the second pixel and that is a non-contour location, to obtain a second depth difference value;

when at least one of the second depth difference value is greater than a second difference threshold, marking the second pixel as a contour location; and obtaining the graphic contour of the target object according to pixels marked as contour locations.

4. The method according to claim 1, wherein after obtaining the 3D depth image of the target object, the method further comprises:

performing background noise reduction processing on the 3D depth image, to obtain a first 3D target depth image; and, wherein performing the difference calculation on the depth values of the pixels in the 3D depth image, to obtain the graphic contour of the target object comprises: performing the difference calculation on depth values of pixels in the first 3D target depth image, to obtain the graphic contour of the target object.

5. The method according to claim 4, wherein performing the background noise reduction processing on the 3D depth image, to obtain a first 3D target depth image comprises:

setting a depth threshold;

comparing a depth value of each pixel in the 3D depth image with the depth threshold;

filtering out a pixel in the 3D depth image that has a depth value greater than the depth threshold; and obtaining remaining pixels to form the first 3D target depth image.

6. The method according to claim 5, wherein after the obtaining the first 3D target depth image, the method further comprises:

performing edge noise reduction processing on the first 3D target depth image, to obtain a second 3D target depth image; and, wherein performing the difference calculation on the depth values of the pixels in the 3D depth image, to obtain the graphic contour of the target object comprises: performing difference calculation on depth values of pixels in the second 3D target depth image, to obtain the graphic contour of the target object.

7. The method according to claim 6, wherein the performing edge noise reduction processing on the first 3D target depth image, to obtain a second 3D target depth image comprises:

segmenting the first 3D target depth image into multiple pixel blocks;

setting a pixel depth segment interval;

performing average processing on depth values of all pixels in each of the pixel blocks, to obtain a pixel average value of each of the pixel blocks; and mapping the pixel average value to a corresponding interval in the pixel depth segment interval, and combining pixel blocks corresponding to all pixel average values in a same interval, to obtain the second 3D target depth image.

8. The method according to claim 1, wherein obtaining the framework parameters of the target object according to depth values of pixels in the 3D depth image of the target object comprises:

obtaining, by using a linear least square method, a central axis of the target object according to depth values of all pixels in the 3D depth image of the target object;

calculating transverse thicknesses of the graphic contour of the target object along multiple first lines perpendicular to the central axis;

calculating longitudinal thicknesses of the graphic contour of the target object along multiple second lines parallel to the central axis; and constituting a framework of the target object by using areas limited by the first lines and the second lines, wherein the corresponding transverse thicknesses and longitudinal thicknesses are the framework parameters of the target object.

9. The method according to claim 8, wherein the retrieving a 3D model matching the framework parameters of the target object and the graphic contour of the target object from a 3D model library, and obtaining a parameter ratio of the 3D model comprises:

performing matching between the graphic contour of the target object and a graphic contour of a 3D model in the 3D model library, to obtain a graphic contour of a 3D model with a highest matching degree;

when the graphic contour of the 3D model is not a front-view graphic contour of the 3D model, obtaining the front-view graphic contour of the 3D model according to the graphic contour of the 3D model;

calculating a visual angle parameter of the 3D model according to the graphic contour of the 3D model and the front-view graphic contour of the 3D model, wherein the visual angle parameter is a visual angle that is of the graphic contour of the 3D model based on the front-view graphic contour of the 3D model;

rotating the front-view graphic contour of the 3D model based on the visual angle parameter, to obtain framework parameters of the 3D model;

obtaining, by means of comparison, a similarity between the framework parameters of the target object and the framework parameters of the 3D model, wherein when the similarity is less than a preset value, the 3D model is the 3D model matching the framework parameters of the target object and the graphic contour of the target object; and obtaining the parameter ratio of the 3D model by using the 3D model.

10. The method according to claim 9, wherein the 3D model library comprises graphic contours of all visual angles of the 3D model, and comprises at least the front-view graphic contour of the 3D model.

11. The method according to claim 10, wherein performing the matching between the graphic contour of the target object and a graphic contour of a 3D model in the 3D model library, to obtain a graphic contour of a 3D model with a highest matching degree comprises:

describing the graphic contour of the target object by using a Zernike moment descriptor and a Fourier descriptor, to obtain first description information;

describing the graphic contour of the 3D model in the 3D model library by using the Zernike moment descriptor and the Fourier descriptor, to obtain second description information; and comparing the first description information and the second description information, and using a graphic contour of a 3D model corresponding to second description information that differs from the first description information by a preset threshold as the graphic contour of the 3D model with the highest matching degree.

12. The method according to claim 1, wherein the obtaining at least one real size of the target object comprises:
transmitting a sound wave signal to the target object;
receiving a sound wave signal reflected by the target object;
obtaining transmission time of the sound wave signal, wherein the transmission time is a difference between time of transmitting the sound wave signal and time of receiving the sound wave signal;
calculating a distance between a surface of the target object and the imaging device by using the transmission time and a propagation velocity of the sound wave signal; and
calculating the at least one real size of the target object by using the distance and an image distance of the imaging device.

13. A terminal for obtaining vital sign data of a target object, comprising:
a 3D sensor, configured to obtain a 3D depth image of a target object, wherein the 3D depth image is a two-dimensional image with distance information, and the distance information indicates a distance between the target object and an imaging device; and
a processor, configured to obtain, according to depth values of pixels in the 3D depth image of the target object, framework parameters of the target object and a graphic contour of the target object, wherein the depth value indicates a distance, obtained according to the distance information, between a point on the target object and the imaging device, the processor is further configured to retrieve a 3D model matching the framework parameters of the target object and the graphic contour of the target object from a 3D model library, and obtain a parameter ratio of the 3D model, and the processor is further configured to obtain at least one real size of the target object and obtain vital sign data of the target object according to the parameter ratio of the 3D model and the at least one real size.

14. The terminal according to claim 13, wherein the 3D sensor is specifically configured to:
transmit a reference pattern to the target object, receive a secondary pattern obtained from the reference pattern being reflected by the target object, calculate an offset value of the secondary pattern relative to the reference pattern, obtain the distance information by performing Fourier transformation on the offset value, and obtain the 3D depth image by using the distance information.

15. The terminal according to claim 13, wherein the processor is further configured to perform difference calculation on the depth values of the pixels in the 3D depth image, to obtain the graphic contour of the target object; and, wherein
performing the difference calculation on the depth values of the pixels in the 3D depth image comprises:
calculating a depth value difference between a depth value of a first pixel in the 3D depth image and a depth value of each of four neighboring pixels connected to the first pixel, to obtain four first depth difference values;
when at least one first depth difference value in the four first depth difference values is greater than a first difference threshold, marking a neighboring pixel corresponding to the at least one first depth difference value as a contour location;
querying whether a pixel marked as a contour location exists in eight neighboring pixels connected to a second pixel in the 3D depth image;
if the pixel marked as a contour location exists in the eight neighboring pixels connected to the second pixel in the 3D depth image, separately performing difference calculation between a depth value of the second pixel and a depth value of a pixel that is in the eight neighboring pixels connected to the second pixel and that is a non-contour location, to obtain a second depth difference value;
when at least one of the second depth difference value is greater than a second difference threshold, marking the second pixel as a contour location; and
obtaining the graphic contour of the target object according to pixels marked as contour locations.

16. The terminal according to claim 13, wherein the processor is further configured to perform background noise reduction processing on the 3D depth image, to obtain a first 3D target depth image; and, wherein
performing the difference calculation on the depth values of the pixels in the 3D depth image, to obtain the graphic contour of the target object comprises: performing the difference calculation on depth values of pixels in the first 3D target depth image, to obtain the graphic contour of the target object.

17. The terminal according to claim 16, wherein the processor is further configured to:
set a depth threshold; and
compare a depth value of each pixel in the 3D depth image with the depth threshold,
filter out a pixel in the 3D depth image that has a pixel depth value greater than the depth threshold, and
obtain remaining pixels to form the first 3D target depth image.

18. The terminal according to claim 17, wherein the processor is further configured to:
perform edge noise reduction processing on the first 3D target depth image, to obtain a second 3D target depth image; and, wherein
performing the difference calculation on the depth values of the pixels in the 3D depth image, to obtain the graphic contour of the target object comprises: performing the difference calculation on depth values of pixels in the second 3D target depth image, to obtain the graphic contour of the target object.

19. The terminal according to claim 18, wherein the processor is specifically configured to:
segment the first 3D target depth image into multiple pixel blocks;
set a pixel depth segment interval;
perform average processing on pixel depth values of all pixels in each of the pixel blocks, to obtain a pixel average value of each of the pixel blocks; and
map the pixel average value to a corresponding interval in the pixel depth segment interval, and combine pixel blocks corresponding to all pixel average values in a same interval, to obtain the second 3D target depth image.

20. The terminal according to claim 13, wherein the processor is specifically configured to:
obtain, by using a linear least square method, a central axis of the target object according to pixel depth values of all pixels in the 3D depth image of the target object;
calculate transverse thicknesses of the graphic contour of the target object along multiple first lines perpendicular to the central axis;

calculate longitudinal thicknesses of the graphic contour of the target object along multiple second lines parallel to the central axis; and constitute a framework of the target object by using areas limited by the first lines and the second lines, wherein the corresponding transverse thicknesses and longitudinal thicknesses are the framework parameters of the target object.

\* \* \* \* \*